(12) United States Patent
Barner

(10) Patent No.: US 9,471,416 B2
(45) Date of Patent: Oct. 18, 2016

(54) PARTITIONED ERROR CODE COMPUTATION

(71) Applicant: Cavium, Inc., San Jose, CA (US)

(72) Inventor: Steven C. Barner, Shrewsbury, MA (US)

(73) Assignee: Cavium, Inc., San Jose, CA (US)

( * ) Notice: Subject to any disclaimer, the term of this patent is extended or adjusted under 35 U.S.C. 154(b) by 107 days.

(21) Appl. No.: 14/193,793

(22) Filed: Feb. 28, 2014

(65) Prior Publication Data

US 2015/0248323 A1    Sep. 3, 2015

(51) Int. Cl.
*G06F 11/00* (2006.01)
*G06F 11/10* (2006.01)

(52) U.S. Cl.
CPC .................... *G06F 11/1004* (2013.01)

(58) Field of Classification Search
CPC .................................................. G06F 11/1004
See application file for complete search history.

(56) References Cited

U.S. PATENT DOCUMENTS

2014/0281844 A1* 9/2014 Jiang et al. .................. 714/807

* cited by examiner

*Primary Examiner* — Bryce Bonzo
*Assistant Examiner* — Thien D Nguyen
(74) *Attorney, Agent, or Firm* — Hamilton, Brook, Smith & Reynolds, P.C.

(57) ABSTRACT

A circuit provides parallel computation of error codes for simultaneously received words. The words received simultaneously may be portions of a common data message, or may be portions of distinct data messages. Accordingly, the circuit selectively accumulates the error codes based on their association with successive data words, outputting an accumulated error code when the last word of a data message has been received and the respective error code is calculated. Based on such information, the error codes calculated in parallel can be output independently, accumulated with one another, or accumulated with the error codes of a previous or subsequent calculation cycle. Thus, the circuit dynamically provides a single parallel error code generation of a given width or multiple parallel error code generations, each of a width divisible by the given width.

22 Claims, 8 Drawing Sheets

PARTITIONED ERROR CODE COMPUTATION

BACKGROUND

Error-detecting codes are commonly implemented in digital networks and storage devices to ensure the integrity of digital data. Such codes can indicate accidental changes to raw data, as a result of channel noise or other errors in transmission or storage. In applications of data transmission, error-detecting codes are typically generated for a given data message and transmitted with the data message. When the data message arrives to its destination, the receiver can check the error-detecting code against an expected error code for the data message. If a mismatch occurs, the receiver can confirm an error in the received data message. In response, the data message can be retransmitted, or, in some cases, the data can be reconstructed using various error-correction techniques.

A cyclic redundancy check (CRC) is a common error-detecting code employed in digital communications. Under CRC error detection, a relatively short check value is calculated for—and attached to—each data message, where the check value is based on the remainder of a polynomial division of the message content. Upon receipt of the message, the calculation is repeated, and, if the check values do not match, an error can be identified for corrective action.

SUMMARY

Example embodiments of the invention provide a circuit for calculating an error code of a data message. In one embodiment, the circuit may include a first computation unit, a second computation unit, and a control circuit. The first computation unit may receive a first word and generate a corresponding first error code, and the second computation unit may receive a second word and generate a corresponding second error code. The control circuit may selectively accumulate the first and second error codes based on one or more control signals. Further, the control circuit may selectively output the first error code, the second error code, or an accumulated error code based on the control signals.

In further embodiments, the control signal may indicate whether either of the first word and the second word is a final word of a data message. If neither word is a final word of a data message, then the control circuit may accumulate the calculated error codes until a final word is indicated. The control circuit may accumulate a plurality of error codes beyond the first and second error code in the absence of such an indication, thereby providing the accumulated error code of a data message comprising several words. For example, the control circuit may accumulate a third, fourth and further error codes along with the first and/or second error codes based on respective words received before or after the first and second words. The first and second computation units may calculate the additional error codes in a previous and/or subsequent calculation cycle. All such error codes can be accumulated continuously by the control circuit until a final word is indicated.

In still further embodiments, the first and second words may be portions of a single data message. Conversely, the first word may be a portion of a first data message and the second word may be a portion of a second data message. Further, the first and second computation units may each include a tree of interconnected exclusive-or (XOR) gates, which can be configured for calculating a cyclic redundancy check (CRC) for the first and second words, the error codes including the CRC. The first and second computation units may be configured to receive the respective words in parallel and output corresponding error codes in parallel. Likewise, the control circuit may output the error codes, including the accumulated error code, in parallel.

In yet further embodiments, a method of calculating an error code of a data message may be provided. In one embodiment, a first error code from a first word may be calculated, and a second error code from a second word may be calculated. The first and second error codes may be selectively accumulated based on one or more control signals. The first and second error codes, as well as an accumulated error code, may be output based on the control signals.

In yet still further embodiments, a circuit for calculating an error code of a data message is provided. In one embodiment, the circuit may include a first computation unit, a second computation unit, and a control circuit. The first computation unit may generate first error codes corresponding to words in a first data stream, while the second computation unit may generate second error codes corresponding to words in a second data stream. The control circuit may selectively accumulate the first and second error codes based on one or more control signals to generate accumulated error codes. Further, the control circuit may selectively output the first error codes, the second error codes, or the accumulated error codes based on the control signals. The control signal may indicate whether the words in the first and second data streams include a final word of a data message.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
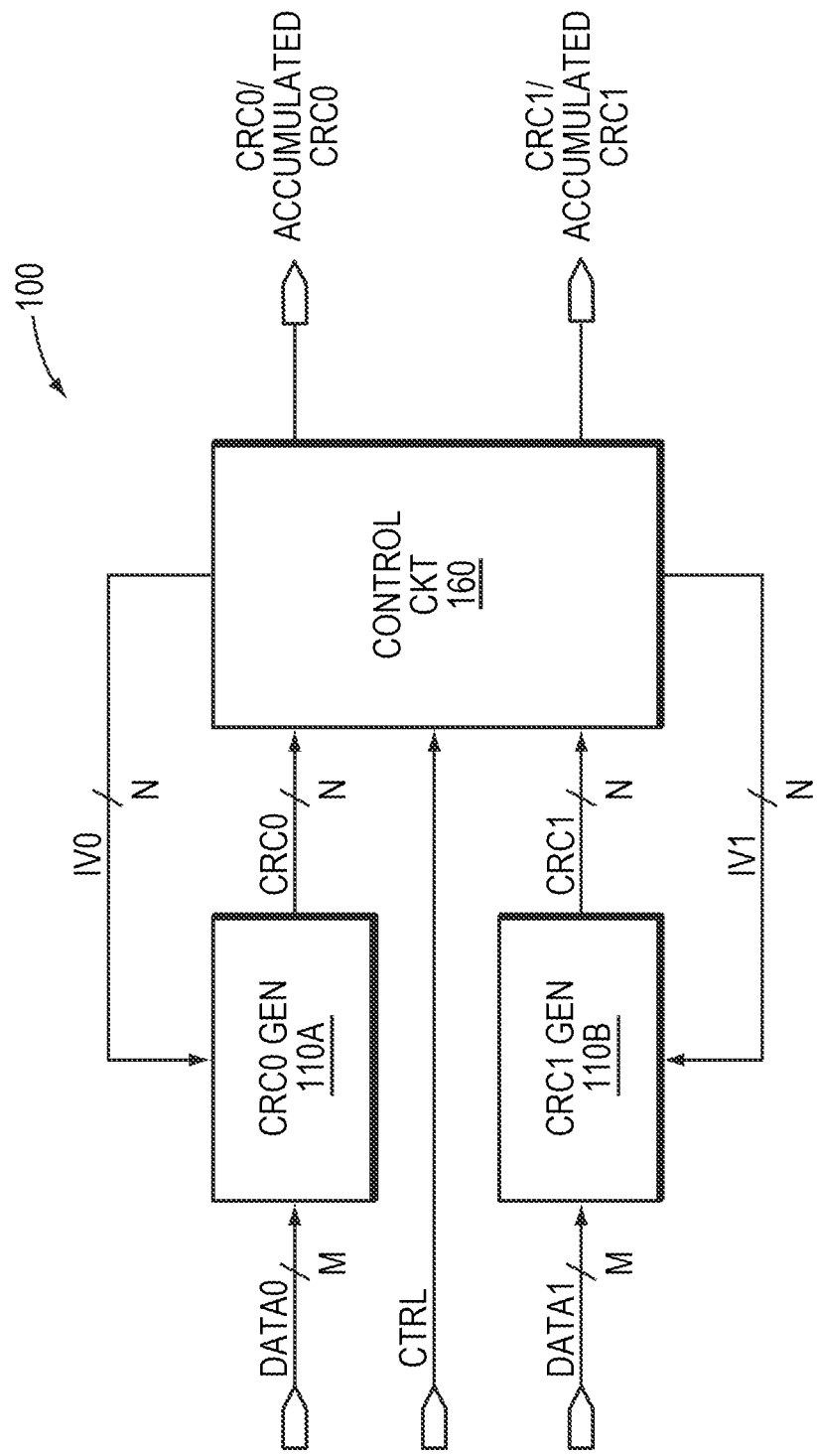
FIG. 1 is a block diagram of a circuit in one embodiment of the invention.

A description of example embodiments of the invention follows.

Various circuitry may be implemented for calculating a cyclic redundancy check (CRC) (also referred to as a check value) of a data message. An example of such a circuit is a feedback shift register, which can be configured to calculate the error code of a data message received serially. However, performing the calculation one bit at a time may not be sufficiently fast for many applications. For example, a modern network processor may output data messages via 8 lanes at 10.315 GBaud. For such a data output, computing CRC error codes serially would require a clock rate in excess of 80 GHz, which is unfeasible under typical hardware.

The challenge of high-bandwidth CRC calculation may be met with a wider data path, which is accommodated by parallel computation techniques. In particular, the operation of the feedback shift register can be "unrolled," allowing the error code of a data word to be calculated as the bits of the word are received in parallel rather than serially. A circuit comprising several connected exclusive or (XOR) gates, also referred to as an "XOR tree," can provide such functionality.

Once the width of the data path grows beyond the size of the word to be calculated for an error code, it can be necessary to perform two different error calculations in a single cycle. For example, an interface of a network processor may have a data path of 128 bits in width, whereas a CRC calculation is in some cases performed on some number of 64-bit words. In such an example, problems may arise when the number of words in a data message is odd. For example, such a circuit might receive a stream of single (64-bit) words requiring separate error calculations. In a further example, a circuit might receive a stream of three (64-bit) words requiring separate error calculations. When the two words received in parallel correspond to the same message, a single 128-bit CRC calculation is required. However, when the two words received in parallel do not correspond to the same message, two 64-bit CRC calculations are required. A single 128-bit CRC XOR tree cannot perform error calculations for two separate 64-bit words in parallel. Rather, it would be necessary to add duplicate CRC hardware to perform both calculations.

Example embodiments of the invention provide partitioned, parallel computation of error codes for received words. The words received in parallel may be portions of a common data message, or may be portions of distinct data messages. Accordingly, the error codes are selectively accumulated based on their association with successive data words, and an accumulated error code is output when the last word of a data message has been received and the respective error code is calculated. Based on how the received words are associated with common data messages, the error codes calculated in parallel can be output independently, accumulated with one another, or accumulated with the error codes of a previous or subsequent calculation cycle. Thus, calculation of error codes can be accomplished in parallel while also accommodating data messages of varying sizes.

FIG. 1 is a block diagram of a circuit 100 in one embodiment of the invention. The circuit 100 includes first and second error code generators (also referred to as calculation units) 110A, 110B and a control circuit 160. The first error code generator 110A may receive a stream of words (DATA0) in parallel, the channel having a width of M bits (e.g., 64 bits). Likewise, the second error code generator 110A may receive a stream of words (DATA1) in parallel, the channel having a width of M bits (e.g., 64 bits). The generators 110A, 110B each include circuitry, such as XOR tree(s), to calculate an error code, such as a CRC check value (CRC0, CRC1) for each received word in succession, outputting the error codes at a parallel channel having a width of N bits. Thus, the circuit 100 can generate error codes for a data stream received in parallel at a width of 2 M bits (e.g., 128 bits). However, because error calculation is partitioned between the first and second generators 110A, 110B, the circuit 100 may operate with greater flexibility than a single error code generator by selectively accumulating the error codes CRC0, CRC1 according to the characteristics of the data word input DATA0, DATA1.

To provide such operation, the control circuit 160 receives the error codes CRC0, CRC1 output from the first and second generators 110A-B, as well as a control signal CTRL. The control signal CTRL can indicate, for example, whether either or both of the words DATA0, DATA1 of the current calculation cycle are the final word(s) of a data message. For calculating the error code of a data message, the error codes of each of its constituent words may be accumulated, and the accumulated error code is output as the error code for the data message. Thus, the control circuit 160 may selectively loop an "initial" or "intermediate" error code (referred to as "initial value" (IV)) back to one or both of the generators 110A-B for accumulation. Alternatively, the control circuit 160 may include circuitry, such as one or more XOR trees, for accumulating and calculating the accumulated error code of a series of error code components received from the error code generators 110A, 110B. The control circuit 160 may continue to control accumulation of the error codes until the control signal CTRL indicates that one of the error codes CRC0, CRC1 in the present calculation cycle corresponds to the last word of a data message. In response, the control circuit 160 may output the accumulated error code for the data message. Alternatively, if either of the error codes CRC0, CRC1 in the current cycle corresponds to a word of a single-word data message, then no accumulation may be necessary, and the control circuit 160 can output the error code directly and without accumulation.

Figure 2:
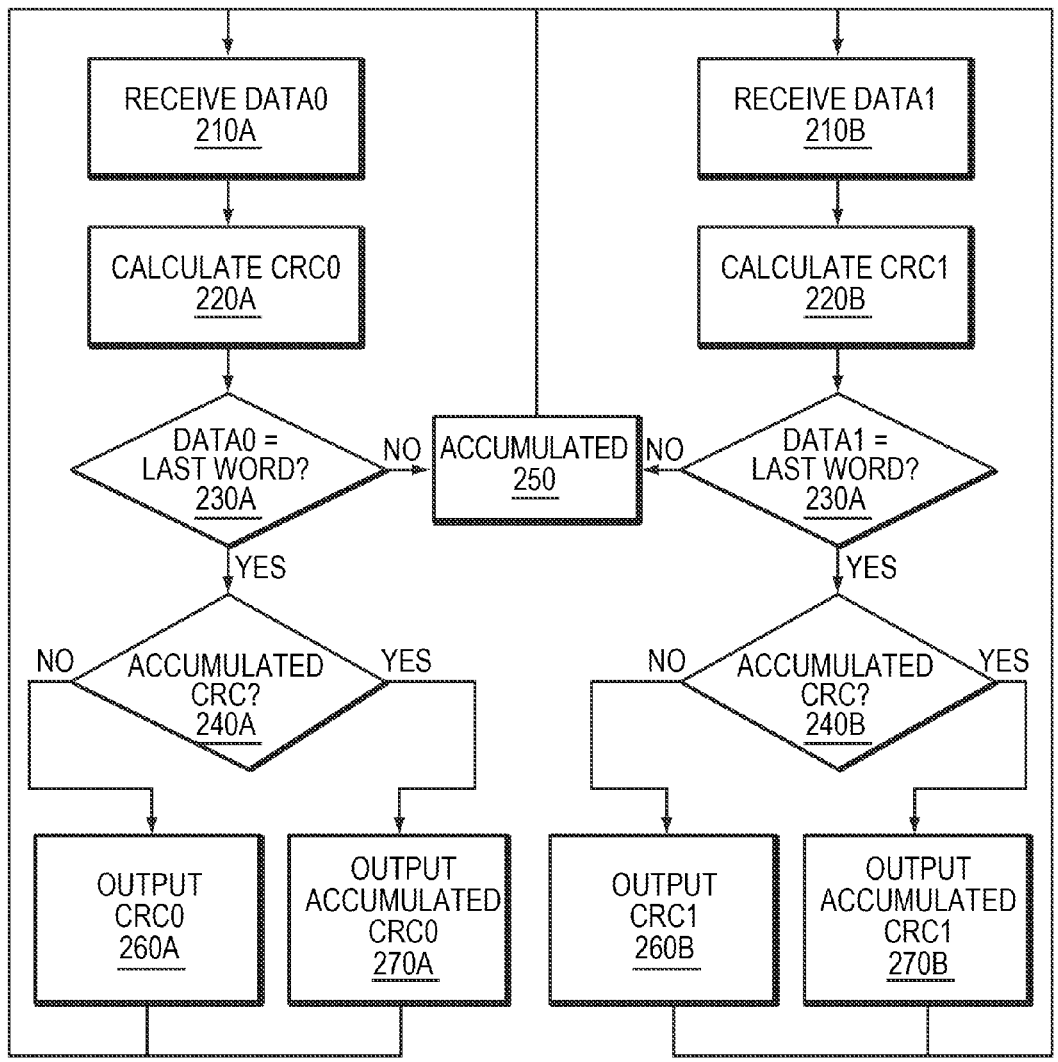
FIG. 2 is a flow diagram of a method of calculating an error code implementing the circuit of FIG. 1.

The circuit 100 may be configured for operation in further detail as illustrated in FIG. 2 and described below.

FIG. 2 is a flow diagram of a process 200 of calculating an error code in an example embodiment. The process 200 may be implemented by the circuit 100 of FIG. 1, as well as by the embodiments described below with reference to FIGS. 3-7. With reference to FIG. 1, in a given calculation cycle, each of the error code generators 110A, 110B receive respective words DATA 0, DATA1 (210A, 210B) and calculate respective error codes CRC0, CRC1 (220A, 220B). The error codes CRC0, CRC1 are received by the control circuit 160, which also receives one or more control signal(s) CTRL. Based on the control signal(s), the control circuit 160 can determine whether each of the words DATA0, DATA1 is the last word of a data message (230A, 230B). If not, then the error codes for the non-final words are accumulated by the control circuit (by feeding the error codes CRC0, CRC0 back to one of the generators 110A, 110B for accumulation), and the accumulated value is maintained for the next calculation cycle (250). If the word is not the first word of a data message, then the control circuit 160 may accumulate the word with an accumulated error code for the previous words in a data message, and store the accumulated value for further accumulation with successive words. Otherwise, if the word is the first word of a data message, then the error code (as IV0/IV1) may simply be looped back by the control circuit 160 to the respective generator 110A, 110B for accumulation with error code(s) in successive cycles. Notably, the words DATA0, DATA1 may be successive words of a single data message, particularly if the circuit 100 receives the words as a data stream that is striped across the inputs of the error code generators 110A, 110B. In such a case, the corresponding error codes CRC0, CRC1 may be accumulated together, along with any other error codes of the data message in previous or successive calculation cycles.

If either of the words in the current cycle is the last word of a data message, then the control circuit 160 proceeds to output a respective error code for the data message. To determine this output, the control circuit may detect whether there is an intermediate (ongoing) accumulated error code corresponding to additional words of the data message from previous calculation cycles (240A, 240B). If so, then the control circuit may accumulate one or both of the error codes CRC0, CRC1 with the intermediate accumulated error code and output a respective final accumulated error code (270A, 270B). As described above, this accumulation may include the outputs of both generators 110A, 110B if those outputs correspond to the same data message. However, in some embodiments where the words are received in a common data stream, one word (DATA1) may always be successive to the other word (DATA0). In such a case, for a given calculation cycle, the first error code (CRC0) may be selectively accumulated with the second error code (CRC1), but the reverse may not occur due to the sequential ordering of the corresponding data messages. Rather, the second error code may be selectively accumulated with the first error code of a successive calculation cycle.

Alternatively, if there is no accumulated error code from previous cycles, nor are the present error codes CRC0, CRC1 to be accumulated, then the control circuit may directly output one or both of the error codes CRC0, CRC1 (260A, 260B). In such a case, the output error code CRC0, CRC1 may correspond to a data message that does not require accumulation, such as a single-word data message.

The process 200 may be repeated for successive error calculation cycles, the control circuit 160 selectively carrying the accumulated error code(s) through the cycles until all words of a given data message are calculated for error codes and accumulated.

Figure 3:
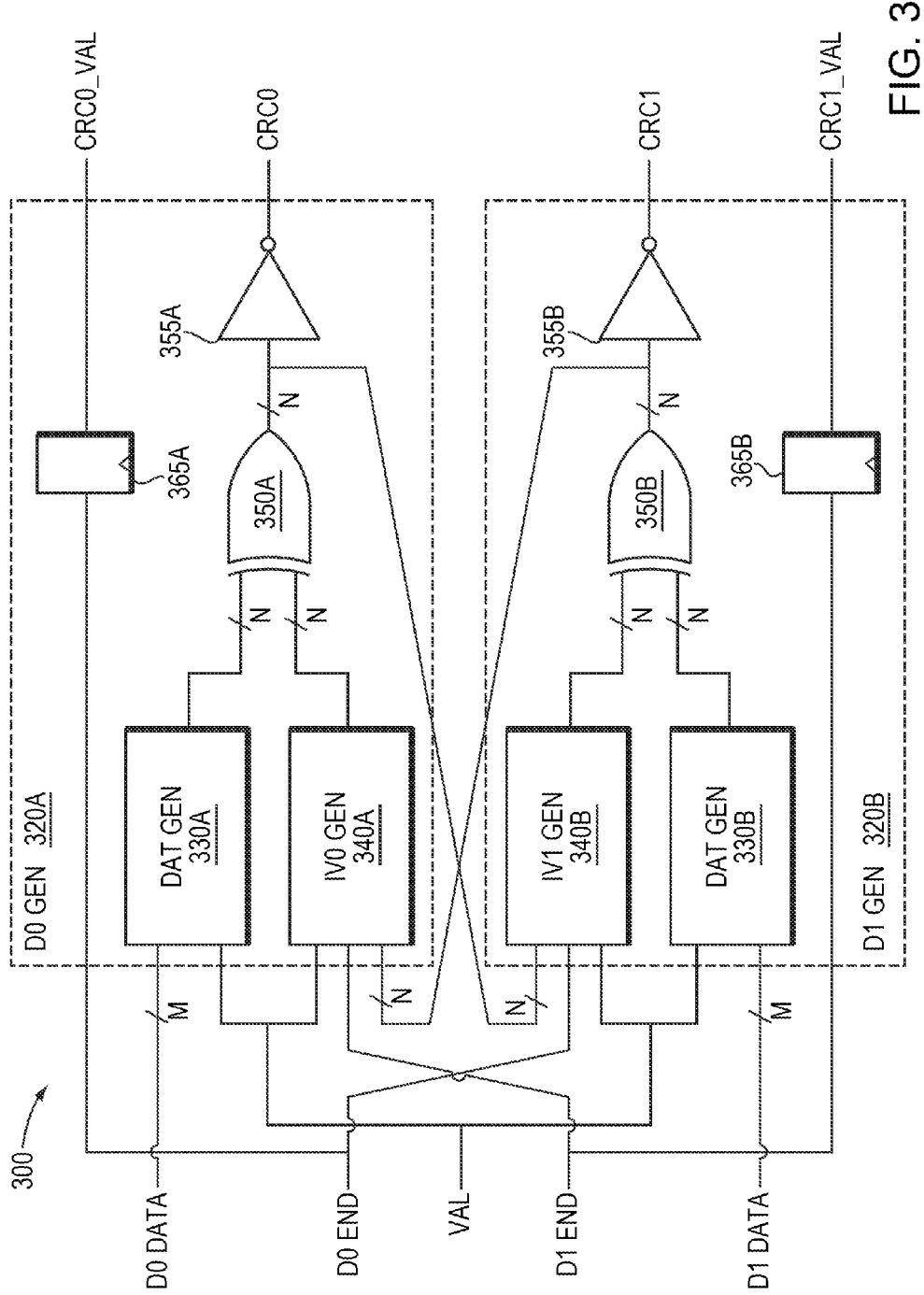
FIG. 3 is a detailed block diagram of a circuit in one embodiment.

FIG. 3 is a detailed block diagram of a circuit 300 in one embodiment. The circuit 300 may be configured to include the elements of the circuit 100 described above with reference to FIG. 1, and may be configured to operate error calculation and accumulation as described above with reference to FIG. 2. The circuit 300 includes first and second interconnected units 320A, 320B, which receive first and second data streams of words (D0 DATA, D1 DATA), respectively. Each unit 320A, 320B includes a respective calculation unit (also referred to as a "data value" generator) 330A, 330B, a respective accumulation unit 340A, 340B (also referred to as an "initial value" (IV) generator), a respective XOR gate 350A, 350B, latches 365A, 365B, and inverters/buffers 355A, 355B. In comparison with the circuit 100 of FIG. 1, the first and second interconnected units 320A, 320B may integrate both the error calculation generators 110A, 110B and the control circuit 160 as described below.

The calculation units 330A, 330B receive the first and second data streams of words having M parallel bits (D0 DATA, D1 DATA), respectively, and output corresponding "data" error code components having N parallel bits to XOR gates 350A, 350B. As with the calculation units 330A, 330B, the accumulator units 340A, 340B may include circuitry, such as an XOR tree, for calculating the "accumulation" error code component (also referred to as "initial value" (IV)) of a received word. The XOR gates 350A, 350B perform an XOR operation on these error code components to output the respective error codes (i.e., corresponding to output error codes CRC0, CRC1 via inverters 355A, 355B).

Based on whether the respective word is the last word of a data message, as indicated by control inputs D0 END and D1 END, the error codes may be looped back to the accumulator unit 340A, 340B at the opposite unit 320A, 320B for accumulation. The accumulator units 340A, 340B may include further circuitry for selectively accumulating the received words with prior calculated error codes according to the control signals D0 END, D1 END. An example of such circuitry is illustrated in FIG. 4, described below.

Accumulation of error codes may continue at the accumulation units 340A, 340B until a control signal D0 END, D1 END indicates that a word in the current cycle is the last word of a data message. In response to such a signal, one or both of the units 320A, 320B may output the resulting error codes at outputs CRC0 and CRC1, respectively. Further, outputs CRC0_VAL and CRC1_VAL, which are latched values of the control signals D0 END, D1 END, indicate that the respective error code outputs are valid. The accumulator units 340A, 340B may also respond to the control signals D0 END, D1 END by resetting the accumulation error code component to an initial (i.e., non-accumulated) value for input at the XOR gates 350A, 350B in the next calculation cycle.

Figure 4:
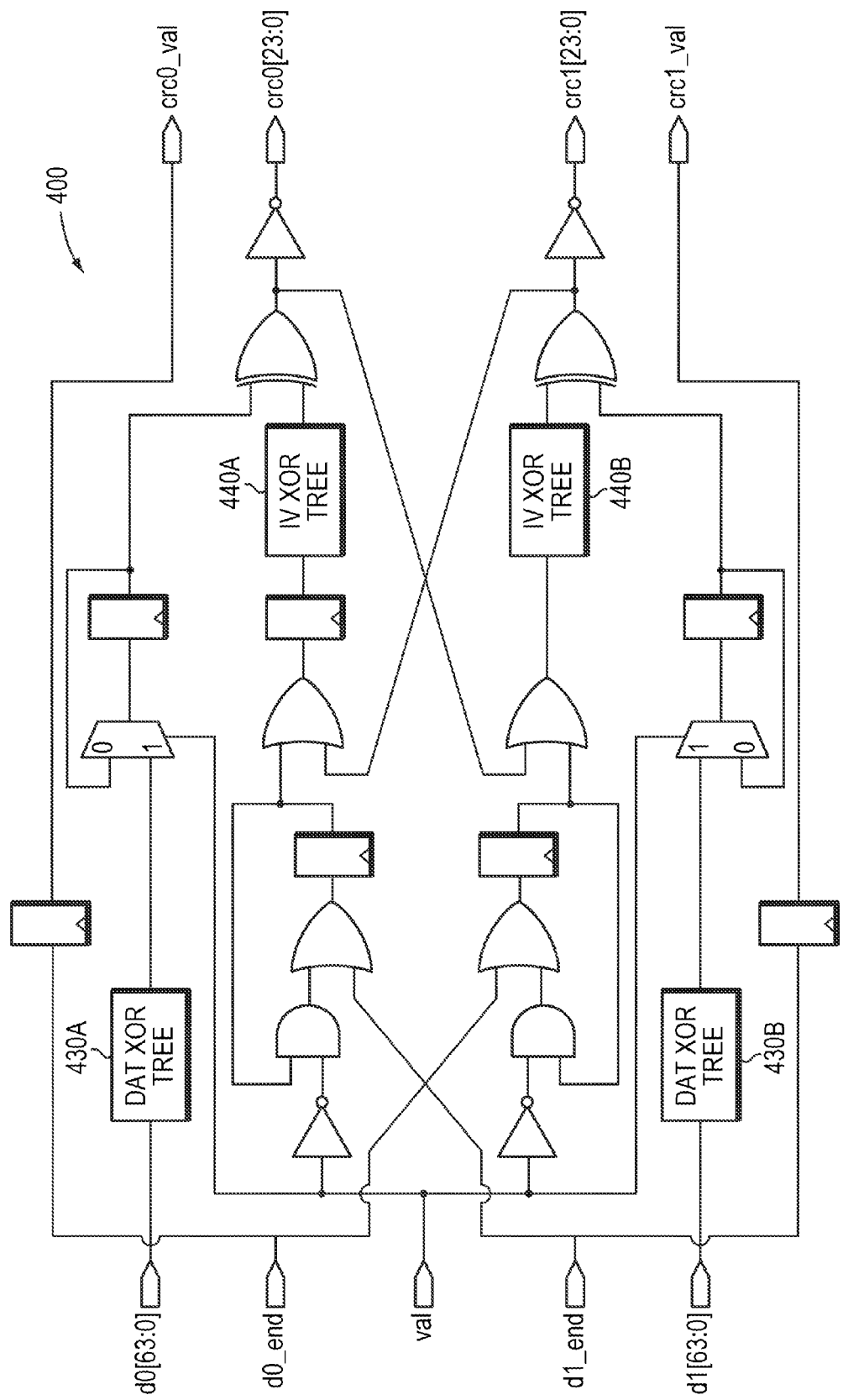
FIG. 4 is a detailed circuit diagram implementing one embodiment of the invention.

FIG. 4 is a circuit diagram of a circuit 400 implementing one embodiment of the invention. The circuit 400 may be configured to include the elements of the circuit 100 described above with reference to FIG. 1, and may be configured to operate error calculation and accumulation as described above with reference to FIG. 2. In particular, the circuit 400 may be comparable to the circuit 300 of FIG. 3, yet with further detail including gating circuitry and interconnection between elements. The circuit 400 includes first and second calculation units 430A, 430B, which may be comparable to the calculation units 330A, 330B of the circuit 300 of FIG. 3. Likewise, the circuit 400 includes first and second accumulator units 440A, 440B, which may be comparable to the accumulator units 340A, 340B of the circuit 300 of FIG. 3.

In addition to these components, the circuit 400 illustrates one example of gating and interconnection circuitry that is able to provide selective error code generation and accumulation as described above with references to FIGS. 1-3. In particular, the circuit 400 operates to receive two streams of data words d0[63:0], d1[63:0] in parallel, calculate corresponding error code components at calculation units 430A, 430B, and selectively accumulate the error codes with one another and/or the error codes or previous or successive calculation cycles at accumulator units 440A, 440B. A determination of this accumulation may be based on the control signal inputs d0_end, d1_end indicating whether either or both data words are the final word(s) of a data message. The valid indicator val is used to enable output of the final error code(s) and to indicate to an external module that the error code(s) are valid.

Figure 5:
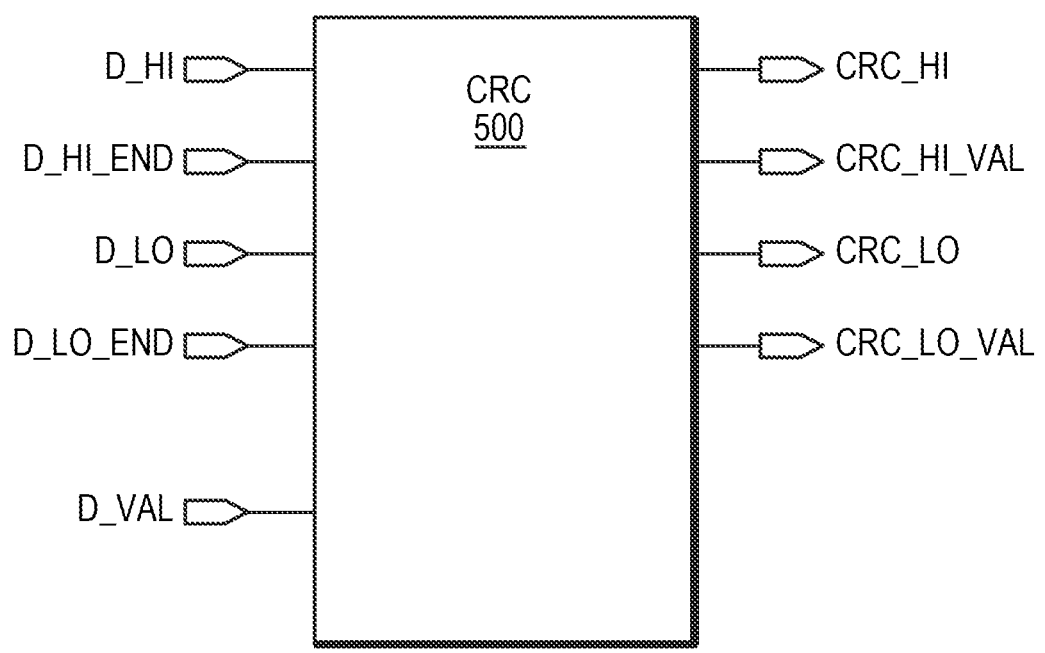
FIG. 5 is a block diagram of a cyclic redundancy check (CRC) calculation circuit according to one embodiment of the invention.
Figure 6:
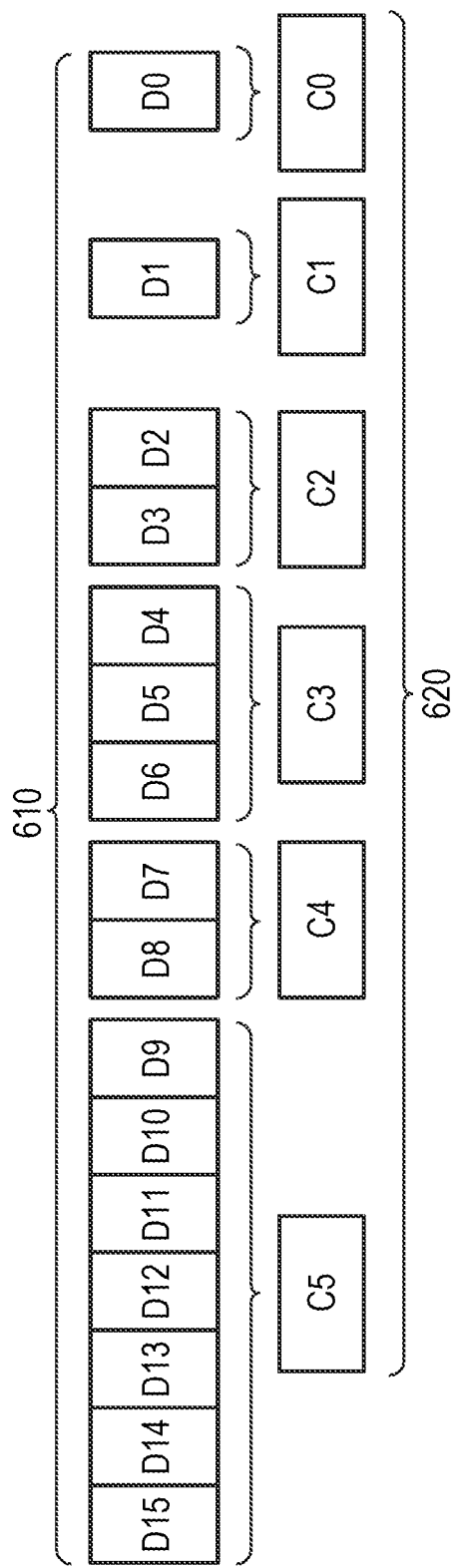
FIG. 6 is a block diagram illustrating a number of words and corresponding data messages for error code calculation.
Figure 7:
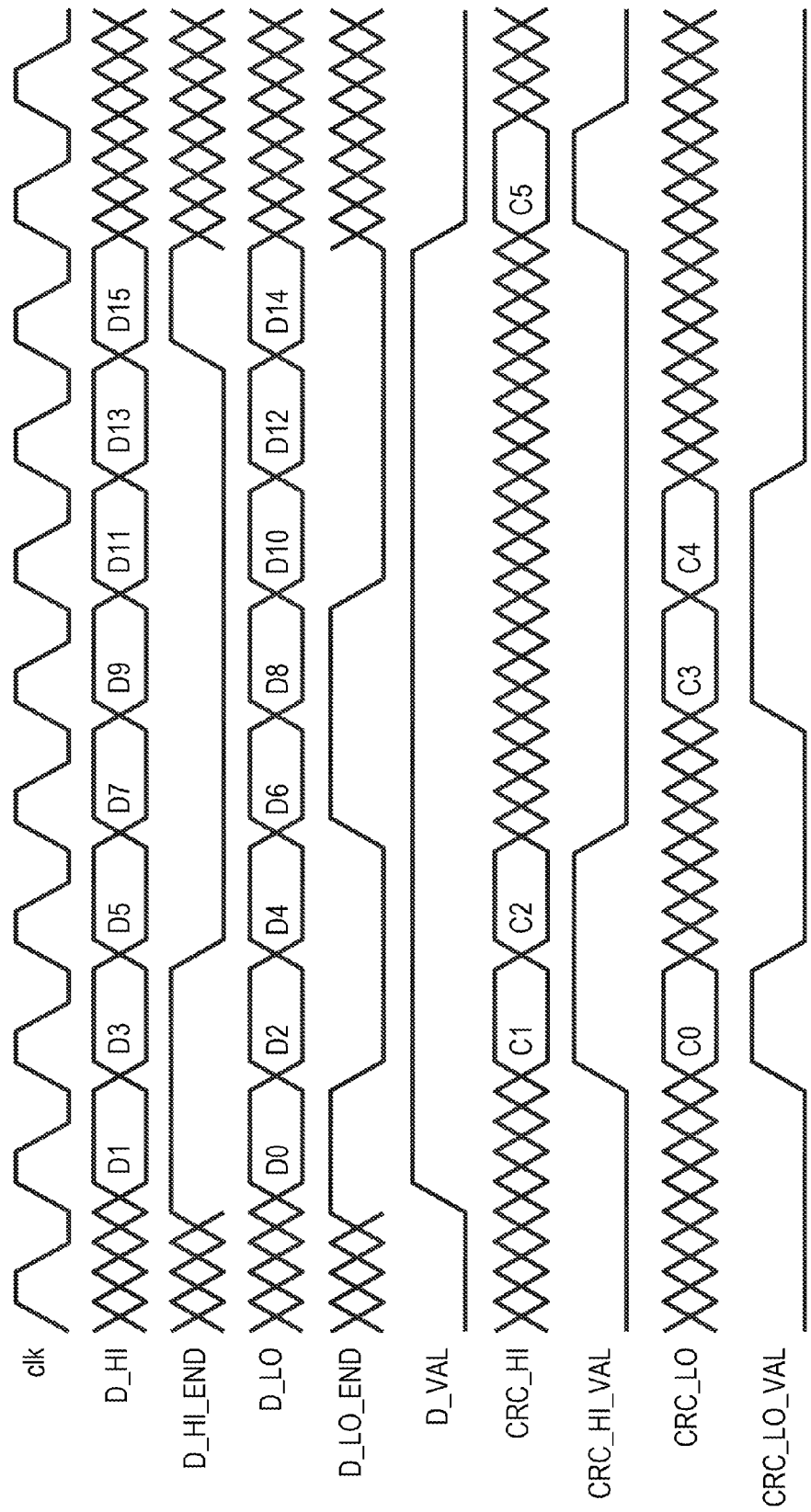
FIG. 7 is a timing diagram illustrating error code calculation of the data messages and words of FIG. 6 according to one embodiment.

FIGS. 5-7 illustrate an error calculation circuit and its operation to generate error codes for a plurality of data messages received in a data stream. Referring first to FIG. 5, an error code calculation circuit 500 may be configured to include the elements of the circuits 100, 300, 400 described above with reference to FIGS. 1, 3 and 4, and may be configured to operate error calculation and accumulation as described above with reference to FIG. 2. Inputs and outputs of the circuit may be comparable to the circuits described above. Among the inputs, D_HI and D_LO are the next two input data words, where D_HI follows D_LO in a series of data words. D_HI_END indicates that D_HI is the last of a group of words entering an error (e.g., CRC) calculation.

Likewise, D_LO END indicates that D_LO is the last of a group of words entering an error calculation. D_VAL indicates that the inputs at D_HI and D_LO are valid words.

Among the outputs, CRC_HI is the error code result for a group of words (i.e., a data message) ending with a word at D_HI. Likewise, CRC_LO is the error code result for a group of words ending with a word at D_LO. Lastly, CRC_HI_VAL and CRC_LO_VAL indicate that CRC_HI_CRC_LO are valid, respectively.

FIG. 6 is a block diagram illustrating a number of words and corresponding data messages for error code calculation by the circuit 500. A stream of data words D0-D15 610 may be received to the inputs D_HI and D_LO of the circuit in an alternating (striped) manner, where D0 is received to D_LO and D1 is received to D_HI in a first cycle, D2 is received to D_LO and D3 is received to D_HI in a second cycle, and so forth through D15. The words D0-D15 are to be grouped as shown (e.g., per common data messages) to generate error codes C0-C5 620 as shown, where the error codes 620 may correspond to each data message. For example, C0 is an error code for a single word message made up of D0, and C2 is an error code for a two-word message comprising D2 and D3. The partition between each message/error code is indicated to the circuit 500 via the inputs D_HI_END and D_LO_END, which indicate when the last word of a data message is received at a respective input D_HI and D_LO.

FIG. 7 is a timing diagram illustrating error code calculation of the data messages and words of FIG. 6 by the circuit 500 of FIG. 5. As shown in FIG. 7, for each clock cycle, the stream of data words D0-D15 are received in an alternating manner to the inputs D_LO and D_HI. During receipt of the data words D0-D15, the control signals D_LO_END and D_HI_END assert high to indicate that the word at the respective input is the last word of a data message (corresponding to the word and message configuration shown in FIG. 6). In response, the circuit 500 outputs the resulting error codes C0-C05 at CRC_LO and CRC_HI in the cycle following receipt of the last word in the message. Lastly, based on the control inputs D_HI_END, D_LOW_END and D_VAL, the circuit 500 outputs signals CRC_HI_VAL and CRC_LO_VAL to indicate whether the signals at CRC_HI and CRC_LO include valid error codes.

Figure 8:
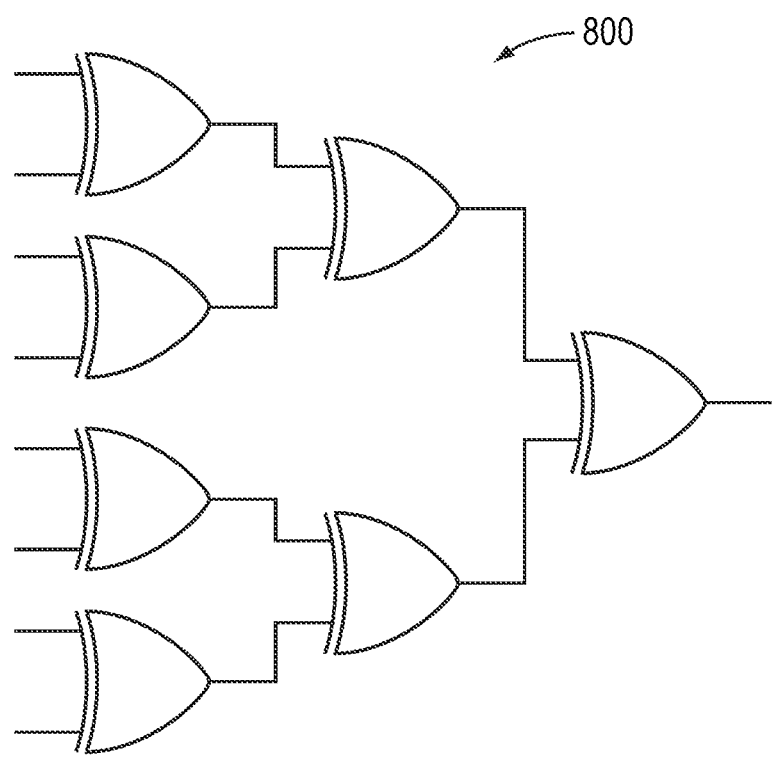
FIG. 8 is a circuit diagram of a portion of an XOR tree that may be implemented in error code calculation units in one embodiment.

FIG. 8 is a circuit diagram of a portion of an XOR tree 800 that may be implemented in the error code calculation units of the circuits described above with reference to FIGS. 1, 3, 4 and 5. In embodiments employing a CRC error check protocol, a calculation of a CRC check value may be based on the remainder of a polynomial division of their contents. As described above, to perform such a calculation in parallel, the process may be "unrolled" and implemented in parallel calculation circuitry, such as the XOR tree 800, where each input at the left of the tree 800 corresponds to a parallel input bit of a data word.

It should be understood that the example flow diagrams presented above can be readily converted to modules, subsystems, or systems that operate in a similar manner as set forth above. For example, the example embodiments may include an initialization module, computing module, and reporting module.

It should be further understood that the examples presented herein can include more or fewer components, be partitioned into subunits, or be implemented in different combinations. Moreover, the diagrams herein may be implemented in hardware, firmware, or software. If implemented in software, the software may be written in any suitable software language. The software may be embodied on any form of computer readable medium, such Random Access Memory (RAM), Read-Only Memory (ROM), or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. A circuit for calculating an error code of a data message, comprising:
    a first computation unit configured to receive a first word and generate a corresponding first error code;
    a second computation unit configured to receive a second word and generate a corresponding second error code; and
    a control circuit configured to 1) selectively accumulate the first and second error codes based on at least one control signal to provide an accumulated error code, 2) selectively loop back the accumulated error code to an input of the control circuit for further accumulation with a subsequent error code generated by at least one of the first and second computation units to provide a final accumulated error code based on the at least one control signal, and 3) selectively output at least one of the first error code, the second error code and the final accumulated error code based on the at least one control signal.

2. The circuit of claim 1, wherein the at least one control signal indicates whether either of the first word and the second word is a final word of a data message.

3. The circuit of claim 2, wherein the control circuit is further configured to accumulate the first and second error codes in response to the at least one control signal indicating that neither of the first and second words is a final word of data message.

4. The circuit of claim 2, wherein the control circuit is further configured to accumulate a plurality of error codes generated by the first and second computation units in the absence of the control signal indicating that either of the first word and the second word is the final word of the data message, the plurality of error codes including the first and second error codes.

5. The circuit of claim 4, wherein the plurality of error codes includes a third error code generated by one of the first and second computation units based on a third word.

6. The circuit of claim 1, wherein the accumulated error code includes an accumulation of a third error code and at least one of the first and second error codes, the third error code being generated by one of the first and second computation units based on a third word.

7. The circuit of claim 1, wherein the control circuit is further configured to accumulate at least one of the first and second error codes with at least a third error code, the third error code being generated by one of the first and second computation units in one of a previous or a subsequent calculation cycle.

8. The circuit of claim 1, wherein the first and second words are portions of a data message.

9. The circuit of claim 1, wherein the first word is a portion of a first data message and the second word is a portion of a second data message.

10. The circuit of claim 1, wherein the first and second computation units each include a tree of interconnected exclusive-or (XOR) gates.

11. A method of calculating an error code of a data message comprising:
- calculating a first error code from a first word;
- calculating a second error code from a second word;
- selectively accumulating the first and second error codes based on at least one control signal to provide an accumulated error code;
- selectively looping back the accumulated error code for further accumulation with a subsequent error code generated by at least one of the first and second computation units to provide a final accumulated error code; and
- selectively outputting at least one of the first error code, the second error code and the final accumulated error code based on the at least one control signal.

12. The method of claim 11, wherein the at least one control signal indicates whether either of the first word and the second word is a final word of a data message.

13. The method of claim 12, further comprising accumulating the first and second error codes in response to the at least one control signal indicating that neither of the first and second words is a final word of data message.

14. The method of claim 12, further comprising accumulating a plurality of error codes generated by the first and second computation units in the absence of the control signal indicating that either of the first word and the second word is the final word of the data message, the plurality of error codes including the first and second error codes.

15. The method of claim 14, wherein the plurality of error codes includes a third error code generated based on a third word.

16. The method of claim 11, wherein the accumulated error code includes an accumulation of a third error code and at least one of the first and second error codes, the third error code being generated based on a third word.

17. The method of claim 11, further comprising accumulating at least one of the first and second error codes with at least a third error code, the third error code being generated by one of the first and second computation units in one of a previous or a subsequent calculation cycle.

18. The method of claim 11, wherein the first and second words are portions of a data message.

19. The method of claim 11, wherein the first word is a portion of a first data message and the second word is a portion of a second data message.

20. The method of claim 11, wherein calculating the first and second error codes includes applying the first and second words in parallel to respective trees of interconnected exclusive-or (XOR) gates.

21. A circuit for calculating an error code of a data message, comprising:
- a first computation unit configured to generate first error codes corresponding to words in a first data stream;
- a second computation unit configured to generate second error codes corresponding to words in a second data stream; and
- a control circuit configured to 1) selectively accumulate the first and second error codes based on at least one control signal to generate accumulated error codes, 2) selectively loop back the accumulated error codes to an input of the control circuit for further accumulation with a subsequent error code generated by at least one of the first and second computation units to provide a final accumulated error code based on the at least one control signal, and 3) selectively output the first error codes, the second error codes and the final accumulated error codes based on the at least one control signal.

22. The circuit of claim 21, wherein the at least one control signal indicates whether the words in the first and second data streams include a final word of a data message.

* * * * *